3,050,397
ALCOHOLIC BEVERAGE AND PROCESS OF MAKING THE SAME
Robert B. Carroll, Doubling Road, Greenwich, Conn.
No Drawing. Filed Jan. 4, 1960, Ser. No. 50
15 Claims. (Cl. 99—30)

This invention relates to an alcoholic beverage having an aged flavor and substantially free from higher alcohols, therefore having no tendency to produce a hangover.

In business and social circles today, it is frequently necessary for the good mixer to imbibe heavily in alcoholic beverages. Such beverages are normally consumed in the form of diluted and mixed drinks, in which the flavor of the alcoholic beverage is frequently masked by dilutions with water, soda or ginger ale, wines and other blending agents. In such drinks, consequently, it is not absolutely essential that the alcoholic beverage base have a good flavor. Many are the hosts, in fact, who use a cheaper grade of liquor for the diluted and mixed drinks than for the people who drink their liquor straight.

Higher alcohols are components of most whiskies on the market today, and the cheaper the grade, the greater the content of higher alcohols is apt to be. The drinker of mixed drinks may well get more than his share of higher alcohols.

Because of the consequences of heavy drinking, it is desirable that the alcoholic beverage be as free from hangover producing components as it is possible to make it. There is a considerable need for an alcoholic beverage substantially free from higher alcohols and like components and which, although it need not have the flavor, aroma and taste of an aged alcoholic beverage, would have such characteristics sufficiently approximating the aged beverage to go undetected in a mixed drink.

The alcoholic beverage provided by the instant invention is indistinguishable in flavor, taste and aroma in most mixed drinks from an aged alcoholic beverage from five to twenty years old. It is free from higher alcohols, that is, alcohols higher than ethyl in molecular weight, including the various isomeric propyl, butyl, amyl, hexyl and heptyl alcohols, and therefore has no tendency to produce hangover. It is also free from methyl alcohol, and formaldehyde, and has a minimum acetaldehyde content, limited to that needed to produce the desired sharp or raw flavor. It is composed of relatively few components, and therefore is quite easily prepared, and inexpensively. In fact, it is fully comparable in cost to a raw entry whiskey, and there is no aging needed to make it saleable.

The beverage of the invention can be prepared to simulate any known whiskey, such as bourbon, rye, Scotch, Irish whiskey, and Canadian whiskey, and also rum, as well as whiskies of new and improved types, by a proper assortment of the components and of the proportions thereof.

The beverage of the invention is based upon ethyl alcohol as the principal alcoholic component. If ethyl alcohol is the only alcohol present, and the beverage is also free from aldehydes, it is quite light, bland and smooth in flavor, and lacks the "hot" taste of the familiar whiskies. If a "hot" or sharp flavor note is desired, small amounts of n-propyl alcohol and of acetaldehyde can be included. Esters of aliphatic alcohols and aliphatic acids not exceeding five carbons on the alcohol and five carbons on the acid, for example, ethyl acetate, ethyl formate, ethyl propionate, n-butyl formate, and n-amyl acetate impart an aged flavor. A small amount of acetic acid can be added to accent the sharp flavor. A bodying agent, which is an aliphatic nontoxic alcohol-soluble polyol, such as glycerol, ethylene glycol and propylene glycol, also is added, to increase the viscosity of the product, and add body of a lasting quality to the flavor.

The ethyl alcohol is first purified by passing it through a bed of activated charcoal, to remove acids, aldehydes and other impurities normally present in commercial grades. Next, in the case of whiskies and brandies, the coloring is provided by the same means as is used in the preparation of ordinary aged alcoholic beverages. Toasted hard wood chips, particularly of maple or oak, are extracted with the ethyl alcohol until the desired color has been obtained. This takes only a short time. Chips smoked with peat smoke are used for Scotch.

The temperature during extraction should be as low as possible, and the time quite short, because of the danger of over-extracting pepper-flavored or tart-flavored wood extractives. The maxima are 90° C. for five minutes. Proportionately longer times can be used at lower temperatures.

The amount of wood chips and the degree of charring are governed by the intensity of color desired. From 2 to 20% by weight of 100 proof ethyl alcohol are usually sufficient. The amount is reduced correspondingly when 190 proof alcohol is used, because of the higher extractive power of such alcohol.

The following table gives the suggested ranges of proportions of several exemplary components for a variety of whiskies, brandies and rum. All quantities are microliters per 100 ml. of 100 proof ethyl alcohol.

TABLE I

| | Rye | Bourbon | Scotch Whiskey | Irish Whiskey | Canadian Whiskey | Rum [1] | Apple Brandy | Grape Brandy | Bland Whiskey, Basic Blend No. 1 | Sharp Whiskey, Basic Blend No. 2 |
|---|---|---|---|---|---|---|---|---|---|---|
| Ethyl alcohol_____ml. | 100 | 100 | 100 | 100 | 100 | 100 | 100 | 100 | 100 | 100 |
| n-Propyl alcohol_____ | 2–25 | 2–30 | 0.5–35 | 5–15 | 4–8 | 2–150 | 25–50 | 15–25 | 1 | 3 |
| Esters: | | | | | | | | | | |
|   Ethyl acetate_____ | 25–50 | 25–100 | 2–15 | 10–30 | 10–30 | 25–75 | 75–175 | 10–50 | 60 | 60 |
|   Ethyl formate_____ | 0–3 | 0–3 | 0–1 | 0–8 | 0–8 | 0–8 | 0–2 | 0–3 | 0.5 | 0.5 |
|   n-Butyl formate____ | | | | | | 0–10 | 0–10 | 0–10 | 0.25 | |
|   n-Amyl acetate_____ | | | | | | 0–5 | 0–5 | 0–5 | 0.1 | |
|   Ethyl propionate___ | | | | | | 0–5 | 0–5 | 0–5 | 0.3 | 0.3 |
| Aldehydes: Acetaldehyde_____ | 0–5 | 0–15 | 0–5 | 5–20 | 5–20 | 0–25 | 10–20 | 0–5 | 0.1 | 0.4 |
| Acids: (Acetic acid is preferred)_____ | to pH 4.5 | to pH 4.5 | to pH 4.5 | to pH 4.5 | to pH 4.5 | to pH 4.5 | to pH 4.5 | to pH 4.5 | to pH 4.5 | to pH 4.5 |
| Polyols: | | | | | | | | | | |
|   Ethylene glycol____ | 150–350 | 150–350 | 10–20 | 50–250 | 50–250 | 150–350 | 75–100 | 75–100 | | 300 |
|   Propylene glycol___ | | | | | | | | | 100 | |

[1] Flavored and colored as desired with caramelized raw sugar instead of wood chips.

The compositions are readily prepared by simple blending of the components with ethyl alcohol which has previously been purified and colored, and are then ready for bottling.

The following examples in the opinion of the inventor represent the best embodiments of his invention.

Example 1

A bourbon Manhattan, bourbon-and-ginger ale, bourbon on the rocks, Old Fashioned and Mint Julep practically indistinguishable from drinks made from an eight year old bourbon in flavor can be prepared from the following formulation.

100 ml. ethyl alcohol (100 proof) was allowed to soak with 10% by weight of lightly toasted oak chips for five minutes at 90° C. There was then added 60 microliters of ethyl acetate, 5 microliters of n-propanol, 3 microliters of acetaldehyde, and 2 microliters of ethyl formate. To 100 microliters of the resulting solution was added 250 microliters of ethylene glycol.

The flavor of these beverages cannot be distinguished from those made with ordinary bourbons.

Example 2

Example 1 was repeated, substituting 250 microliters of propylene glycol for the ethylene glycol. The flavor was slightly less sharp.

Example 3

Example 1 was repeated, substituting 250 microliters of glycerine. This liquor had a sweeter flavor.

Example 4

A somewhat blander bourbon was prepared having the following formulation: 100 ml. of ethyl alcohol (100 proof) was soaked five minutes at 90° C. with 10% by weight charred oak chips. To this was added 34 microliters of ethyl acetate and 10 microliters of n-propanol. To 100 microliters of the resulting solution was added 300 microliters of ethylene glycol.

This product could not be distinguished from an eight year old bourbon when used in a mixed drink such as a Manhattan, an Old Fashioned, a bourbon-and-ginger ale, or a Mint Julep.

Example 5

A Scotch whiskey was prepared having the following formulation: 55 ml. of ethyl alcohol (190 proof) was soaked in 10% by weight of oak chips, which had been lightly toasted in peat smoke for ten minutes at 60° C., and then diluted with 45 ml. of water. To this was added 3 microliters of ethyl acetate and 0.5 microliter of n-propanol. To 100 ml. of the resulitng solution was added 20 microliters of propylene glycol, and sufficient acetic acid to bring the pH to 4.5.

This Scotch whiskey had an excellent flavor and a smoky tang, and could not be distinguished from a fifteen year old Scotch whiskey when mixed with soda water and a twist of lemon, or on the rocks.

Example 6

A rye whiskey was prepared as follows: 100 ml. of ethyl alcohol (100 proof) was soaked with 20% by weight of toasted oak chips at 85° C. for seven minutes. To this was added 50 microliters of ethyl acetate, 3 microliters of ethyl formate, 20 microliters of n-propanol and 1.5 microliters of acetaldehyde.

This whiskey had a slightly raw flavor, which some drinkers appreciate. It had a very satisfactory flavor, indistinguishable from an eight year old rye whiskey, when mixed with ginger ale or on the rocks, and in a rye Old Fashioned.

Example 7

A rum beverage was prepared as follows: to 100 ml. of ethyl alcohol (100 proof) was added 60 microliters of ethyl acetate, 5 microliters of ethyl formate, 5 microliters of n-butyl formate, 0.25 microliter of ethyl propionate, 0.25 microliter of n-amyl acetate, and 5 microliters of n-propanol. 0.5 g. of caramelized raw sugar was then added. This rum made an excellent Daiquiri or Cuba Libre, which could not be distinguished in flavor from drinks made with ten year dark rum.

Example 8

An apple brandy was prepared as follows: 100 ml. of ethyl alcohol (100 proof) was soaked with 10% by weight of toasted maple wood chips for ten minutes at 75° C. To this was added 25 microliters of n-propyl alcohol, 125 microliters of ethyl acetate, 1 microliter of ethyl formate, 0.3 microliter of ethyl propionate, 0.25 microliter of n-butyl formate, 0.10 microliter of n-amyl acetate, and 10 microliters of acetaldehyde. The pH was adjusted to a pH of 4.5 with acetic acid.

This brandy could not be distinguished in flavor from a six year old apple brandy when mixed in a Jack Rose, in a Cobbler, in Fish House Punch, in a Puff, in an Old Fashioned, in a Side Car, or in a Stinger.

Example 9

A grape brandy was prepared as follows: 100 ml. of ethyl alcohol (100 proof) was soaked with 10% by weight of toasted oak wood chips for ten minutes at 60° C. To this was added 15 microliters of n-propyl alcohol, 30 microliters of ethyl acetate, 3 microliters of ethyl formate, 0.10 microliter of n-butyl formate, 0.3 microliter of ethyl propionate, and 5 microliters of acetaldehyde. The pH was adjusted to a pH of 4.5 with acetic acid.

This brandy had an excellent flavor and could not be distinguished from a six year old grape brandy when mixed in a Jack Rose, in a Cobbler, in Fish House Punch, in a Puff, in an Old Fashioned, in a Side Car, or in a Stinger.

Example 10

A Canadian type whiskey was prepared as follows: 100 ml. of ethyl alcohol (100 proof) was soaked with 20% by weight of toasted oak chips at 85° C. for seven minutes. To this was added 8 microliters of n-propanol, 13 microliters of ethyl acetate, 4 microliters of ethyl formate, 8 microliters of acetaldehyde, and 50 microliters of ethylene glycol.

This whiskey had a slightly raw flavor which some drinkers appreciate, and a very satisfactory flavor indistinguishable from an eight year old Canadian Club whiskey when mixed with ginger ale or on the rocks, and in an Old Fashioned.

Example 11

An Irish whiskey was prepared as follows: 100 ml. of ethyl alcohol (100 proof) was soaked with 10% by weight of lightly toasted oak chips for five minutes at 90° C. There was then added 10 microliters of n-propanol, 16 microliters of ethyl acetate, 1 microliter of ethyl formate, 12 microliters of acetaldehyde, and 80 microliters of ethylene glycol.

The flavor of this beverage cannot be distinguished from an eight year old Irish whiskey in flavor when used in a Manhattan, or on the rocks, or mixed with ginger ale.

I claim:

1. A synthetic alcoholic beverage having a simulated aged flavor and substantially free from higher alcohols, consisting essentially of ethyl alcohol, and per 100 ml. of 100 proof ethyl alcohol, from 2 to 175 microliters of an organic ester of an aliphatic acid and an aliphatic alcohol having not over ten carbon atoms, from 2 to 150 microliters of n-propanol, and from 150 to 350 microliters of a non-toxic aliphatic alcohol-soluble polyol.

2. A synthetic beverage in accordance with claim 1 in which the ester is ethyl acetate.

3. A synthetic beverage in accordance with claim 2, comprising also ethyl formate.

4. A synthetic beverage in accordance with claim 1 which also includes from 0 to 25 microliters of acetaldehyde.

5. A synthetic beverage in accordance with claim 1 which also includes sufficient acetic acid to adjust the pH to approximately 4.5.

6. A synthetic beverage in accordance with claim 1 in which the polyol is ethylene glycol.

7. A synthetic beverage in accordance with claim 1 in which the polyol is glycerine.

8. A synthetic beverage in accordance with claim 1 in which the polyol is propylene glycol.

9. A synthetic Scotch beverage comprising ethyl alcohol, and, per 100 ml. of 100 proof ethyl alcohol, from 2 to 15 microliters of ethyl acetate, from 0 to 1 microliter of ethyl formate, from 0 to 5 microliters of acetaldehyde, from 0.5 to 35 microliters of n-propanol, and from 10 to 20 microliters of a non-toxic aliphatic alcohol-soluble polyol.

10. A synthetic bourbon beverage comprising ethyl alcohol, and, per 100 ml. of 100 proof ethyl alcohol, from 25 to 100 microliters of ethyl acetate, from 0 to 3 microliters of ethyl formate, from 2 to 30 microliters of n-propanol, from 0 to 15 microliters of acetaldehyde, and from 150 to 350 microliters of a non-toxic aliphatic alcohol-soluble polyol.

11. A synthetic rye beverage comprising ethyl alcohol, and for each 100 ml. of 100 proof ethyl alcohol, from 25 to 50 microliters of ethyl acetate, from 2 to 25 microliters of n-propanol, from 0 to 3 microliters of ethyl formate, from 0 to 5 microliters of acetaldehyde, and from 150 to 350 microliters of a non-toxic aliphatic alcohol-soluble polyol.

12. A synthetic rum beverage comprising ethyl alcohol, and for each 100 ml. of 100 proof ethyl alcohol, from 2 to 150 microliters of n-propanol, from 25 to 75 microliters of ethyl acetate, from 0 to 8 microliters of ethyl formate, from 0 to 25 microliters of acetaldehyde, from 0 to 10 microliters of n-butyl formate, from 0 to 5 microliters of n-amyl acetate, from 0 to 5 microliters of ethyl propionate, and from 150 to 350 microliters of a non-toxic aliphatic alcohol-soluble polyol.

13. A synthetic brandy comprising ethyl alcohol, and for each 100 ml. of 100 proof ethyl alcohol, from 15 to 50 microliters of n-propanol, from 10 to 175 microliters of ethyl acetate, from 0 to 3 microliters of ethyl formate, from 0 to 25 microliters of acetaldehyde, from 0 to 10 microliters of n-butyl formate, from 0 to 5 microliters of n-amyl acetate, from 0 to 5 microliters of ethyl propionate, and from 75 to 100 microliters of a non-toxic aliphatic alcohol-soluble polyol.

14. A synthetic Canadian type whiskey beverage comprising ethyl alcohol, and per 100 ml. of 100 proof ethyl alcohol, from 4 to 8 microliters of n-propanol, from 10 to 30 microliters of ethyl acetate, from 0 to 8 microliters of ethyl formate, from 5 to 20 microliters of acetaldehyde, and from 50 to 250 microliters of a non-toxic aliphatic alcohol-soluble polyol.

15. A synthetic Irish type whiskey beverage comprising ethyl alcohol, and per 100 ml. of 100 proof ethyl alcohol, from 5 to 15 microliters of n-propanol, from 10 to 30 microliters of ethyl acetate, from 0 to 8 microliters of ethyl formate, from 5 to 20 microliters of acetaldehyde, and from 50 to 250 microliters of a non-toxic aliphatic alcohol-soluble polyol.

References Cited in the file of this patent

UNITED STATES PATENTS 1,384,680     Smith et al. _____ July 12, 1921

FOREIGN PATENTS 2,123     Great Britain _____ June 16, 1873

OTHER REFERENCES

Text book: "Beverages And Their Adulteration," by Harvey W. Wiley, copyright 1919, by P. Blakiston's Son & Co., Philadelphia Pa., pp. 279, 280, 281, 284, 286, 291, 350, 366.

Pigman and Goepp: "Chemistry of the Carbohydrates," 1948, Academic Press, New York, page 232.